US007994088B2

(12) United States Patent
Pak et al.

(10) Patent No.: US 7,994,088 B2
(45) Date of Patent: Aug. 9, 2011

(54) SUPPORTED CATALYST, METHOD OF PREPARING THE SAME, AND FUEL CELL USING THE SAME

(75) Inventors: Chan-ho Pak, Yongin-si (KR); Dae-jong Yoo, Yongin-si (KR); Sang-hoon Joo, Yongin-si (KR); Hyuk Chang, Yongin-si (KR); Seol-ah Lee, Yongin-si (KR)

(73) Assignee: Samsung SDI Co., Ltd., Suwon-si, Gyeonggi-do (KR)

( * ) Notice: Subject to any disclaimer, the term of this patent is extended or adjusted under 35 U.S.C. 154(b) by 725 days.

(21) Appl. No.: 11/708,600

(22) Filed: Feb. 21, 2007

(65) Prior Publication Data
US 2007/0270305 A1    Nov. 22, 2007

(30) Foreign Application Priority Data

May 16, 2006    (KR) .................. 10-2006-0043940

(51) Int. Cl.
| | |
|---|---|
| H01M 4/88 | (2006.01) |
| B01J 21/18 | (2006.01) |
| B01J 23/00 | (2006.01) |
| B01J 23/40 | (2006.01) |
| B01J 23/74 | (2006.01) |
| H01M 4/02 | (2006.01) |
| H01M 4/36 | (2006.01) |
| H01M 4/92 | (2006.01) |
| H01M 4/94 | (2006.01) |
| H01M 4/90 | (2006.01) |

(52) U.S. Cl. ........ 502/180; 502/101; 502/182; 502/185; 429/523; 429/524; 429/525; 429/526

(58) Field of Classification Search .................. 502/101, 502/180, 182, 185; 429/12, 40–44, 523–526
See application file for complete search history.

(56) References Cited

U.S. PATENT DOCUMENTS

| | | | | |
|---|---|---|---|---|
| 4,186,110 A | * | 1/1980 | Jalan et al. | 502/101 |
| 4,783,434 A | * | 11/1988 | Wigman et al. | 502/167 |

(Continued)

FOREIGN PATENT DOCUMENTS

CN    1318873 A    10/2001

(Continued)

OTHER PUBLICATIONS

Translation of Office Action issued in Korean Patent Application No. 2006-43940 on Apr. 30, 2007.*

(Continued)

Primary Examiner — Patricia L Hailey
(74) Attorney, Agent, or Firm — Lee & Morse, P.C.

(57) ABSTRACT

A method of preparing a supported catalyst, a supported catalyst prepared by the method, and a fuel cell using the supported catalyst. In particular, a method of preparing a supported catalyst by preparing a primary supported catalyst containing catalytic metal particles that are obtained by a primary gas phase reduction reaction of a portion of the final loading amount of a catalytic metal, and reducing the remaining portion of the catalytic metal by a secondary liquid phase reduction reaction using the primary supported catalyst. The supported catalyst contains catalytic metal particles having a very small average particle size, which are uniformly distributed on a carbon support at a high concentration, and thus exhibits maximal catalyst activity. A fuel cell produced using the supported catalyst has improved efficiency.

45 Claims, 6 Drawing Sheets

U.S. PATENT DOCUMENTS

| | | | | |
|---|---|---|---|---|
| 5,068,161 | A | 11/1991 | Keck et al. | |
| 5,523,181 | A | 6/1996 | Stonehart et al. | |
| 5,766,787 | A | 6/1998 | Watanabe et al. | |
| 5,795,669 | A | 8/1998 | Wilkinson et al. | |
| 6,287,717 | B1 | 9/2001 | Cavalca et al. | |
| 6,506,228 | B2 * | 1/2003 | Lee et al. | 75/351 |
| 6,649,300 | B2 * | 11/2003 | Ito et al. | 429/44 |
| 7,132,385 | B2 * | 11/2006 | Pak | 502/185 |
| 7,381,682 | B1 * | 6/2008 | Jia et al. | 502/327 |
| 7,381,683 | B1 * | 6/2008 | Wang et al. | 502/327 |
| 7,569,509 | B2 * | 8/2009 | Oonuma | 502/185 |
| 7,589,043 | B2 * | 9/2009 | Yoo et al. | 502/180 |
| 2002/0177525 | A1 | 11/2002 | Xing et al. | |
| 2004/0076870 | A1 | 4/2004 | Tanaka et al. | |
| 2004/0115515 | A1 | 6/2004 | Ueda et al. | |
| 2006/0099482 | A1 | 5/2006 | Scott et al. | |
| 2006/0166811 | A1 | 7/2006 | Huang et al. | |
| 2006/0240311 | A1 | 10/2006 | Dziallas | |
| 2007/0269699 | A1 | 11/2007 | Pak et al. | |

FOREIGN PATENT DOCUMENTS

| | | | |
|---|---|---|---|
| CN | 1430302 | A | 7/2003 |
| CN | 1588680 | A | 3/2005 |
| CN | 1612381 | A | 5/2005 |
| CN | 1661836 | A | 8/2005 |
| CN | 1738089 | A | 2/2006 |
| CN | 0168607 | A | 12/2006 |
| CN | 0007738 | A | 1/2007 |
| DE | 19919881 | A1 | 11/2000 |
| EP | 0926754 | A1 | 6/1999 |
| EP | 1063334 | A1 | 12/2000 |
| JP | 01-227361 | * | 9/1989 |
| JP | 2002-530818 | A | 9/2002 |
| JP | 2004-047386 | A | 2/2004 |
| JP | 2005-063749 | A | 3/2005 |
| JP | 2005-537618 | A | 12/2005 |
| KR | 10-2004-0088288 | * | 10/2004 |
| KR | 10 2004-0088288 | A | 10/2004 |
| KR | 10-2005-0031017 | * | 4/2005 |
| KR | 2005-31017 | | 4/2005 |
| WO | WO 02/073722 | A1 | 9/2002 |
| WO | WO 2004-109828 | A2 | 12/2004 |

OTHER PUBLICATIONS

M. Götz and H. Wendt, "Binary and Ternary Anode Catalyst Formulations including the Elements W, Sn and Mo for PEMFCs Operated on Methanol or Reformate Gas", Electrochimica Acta, vol. 43 (1998), No. 24, pp. 3637-3644.

Ermete Antolini, "Formation of Carbon-Supported PtM Alloys for Low Temperature Fuel Cells: A Review", Materials Chemistry and Physics, vol. 78 (2003), pp. 563-573.

Office Action issued by State Intellectual Property Office of China in Chinese Patent Application No. 200710001431X.

Office Action issued in Korean Patent Application No. 2006-43940 on Apr. 30, 2007.

Antolini, Formation of Carbon-Supported PtM Alloys for Low Temperature Fuel Cells: A Review; Journal of Materials Chemistry and Physics; 2003; 563-573; vol. 78, Elsevier, Genova, Italy.

Tatsumachi, et al.; Method for Manufacturing Anode for Fuel Cell; English Translation; Sep. 11, 1989; Japan.

Caillard et al., "Structure of Pt/C and PtRu/C catalytic layers prepared by plasma sputtering and electric performance in direct methanol fuel cells (DMFC)", 2006, Elsevier, Journal of Power Sources 162, pp. 66-73 (*cited in co pending U.S. Appl. No. 11/708,599 in an Office action mailed Dec. 30, 2010*).

Chinese Office Action in application CN 200710001423 5, Office action dated May 8, 2009, with partial English translation (*citing CN 1612381 A and CN 1738089 A, items 1 and 2 above; this Chinese Office action issued in Chinese application 200710001423, which corresponds to Korean application KR 10-2006-043941, to which co -pending U.S. Appl. No. 11/708,599 claims priority*).

Japanese Office Action in JP 2007-130933, dated Feb. 15, 2011, (Pak, et al.).

Chinese Office Action in CN 200710001423.5, dated Mar. 8, 2011, (Pak, et al.).

Chinese Registration Determination Certificate in CN 101219402 B, dated Apr. 20, 2011.

* cited by examiner

US 7,994,088 B2

SUPPORTED CATALYST, METHOD OF PREPARING THE SAME, AND FUEL CELL USING THE SAME

CROSS-REFERENCE TO RELATED APPLICATIONS

This application claims the benefit of Korean Patent Application No. 2006-43940, filed May 16, 2006, in the Korean Intellectual Property Office, the disclosure of which is incorporated herein by reference.

BACKGROUND OF THE INVENTION

1. Field of the Invention

Aspects of the present invention relate to a method of preparing a supported catalyst, a supported catalyst prepared by the method, and a fuel cell using the supported catalyst, and in particular, to a method of preparing a supported catalyst by preparing a primary supported catalyst containing catalytic metal particles that are obtained by a primary gas phase reduction reaction of a portion of the final loading amount of a catalytic metal, and reducing the remaining portion of the catalytic metal by a secondary liquid phase reduction reaction using the primary supported catalyst, a supported catalyst prepared by the method, and a fuel cell using the supported catalyst.

2. Description of the Related Art

Fuel cells, which are considered to be a clean energy source of the future that can replace fossil energy, have high output densities and high energy conversion efficiencies, are operable at ambient temperature, and can be miniaturized and tightly sealed. Thus, fuel cells can be used in a wide range of applications, such as contamination-free automobiles, domestic power generating systems, mobile communication devices, medical instruments, military equipment, equipment for the space industry, and portable electronic instruments. Polymer electrolyte membrane fuel cells (PEMFCs) and direct methanol fuel cells (DMFCs) are electric power generating systems that produce direct current (DC) electricity from an electrochemical reaction involving methanol, water, and oxygen. Generally, these fuel cells have a structure comprising an anode and a cathode, to which a reaction liquid or gas is supplied, and a proton conducting membrane interposed between the anode and the cathode. The anode and the cathode contain catalysts, which degrade hydrogen or methanol to generate protons. The protons thus generated then pass through the proton conducting membrane and react with oxygen, the reaction being catalyzed by the catalyst present in the cathode, to produce electricity. Therefore, the significance of catalysts in such fuel cells is considerable.

Currently, in the case of PEMFC, both the anode and the cathode employ platinum (Pt) particles dispersed over the surface of an amorphous carbon support, and in the case of DMFC, the anode employs PtRu, while the cathode employs platinum in the form of metal particles or dispersed on an amorphous carbon support. However, using metal particles as the catalyst often results in much better reactivity, and thus, a supported metal catalyst is rarely used in DMFCs.

However, in the case of DMFC, the catalyst cost represents a large percentage of the total production cost, and thus it is necessary to reduce the amount of the catalyst used so as to secure a competitive price for the fuel cell. As an attempt to successfully reduce the amount of the catalyst used in the anode or the cathode, it has been suggested to use a carbon support which can increase the catalyst activity or increase the degree of dispersion of catalytic metal particles, compared with the amorphous carbon supports that are currently in use, or to use a supported catalyst which has a high concentration of catalytic metal particles dispersed on the support with a high degree of dispersion. Thus, it is necessary to develop a process for preparing such supported catalysts having high concentrations of catalytic metal particles at high degrees of dispersion, and it is also necessary to re-design the structure of the membrane electrode assembly (MEA) so as to obtain high performance, such as maximal catalyst activity.

Active research is being conducted to develop electrodes, fuel, and electrolyte membranes that are used in fuel cells, and to enhance the output density and the output voltage by increasing the energy density in fuel cells. In particular, there has been an attempt to enhance the catalyst activity of the catalysts used in fuel cell electrodes. The catalysts used in PEMFC or MDFC generally contain Pt or alloys of Pt with other metals, and thus it is necessary to reduce the amount of these catalytic metals used in order to secure competitive prices of the catalysts. Accordingly, in an attempt to reduce the amount of catalyst while maintaining or increasing the performance of a fuel cell, a method of increasing the specific surface area of a catalytic metal by using a conductive carbon material having a large specific surface area as a support, and dispersing fine particles of platinum or an alloy onto the conductive carbon material support, is being used.

As the effective specific surface area of a catalyst is increased, the catalyst activity is increased, and thus, in order to increase the effective specific surface area, the overall amount of the supported catalyst used can be increased. However, in this case, the amount of the carbon support being used will be also increased, along with the increase in the overall amount of catalyst, and the thickness of the fuel cell containing the supported catalyst will also be increased, thereby resulting in an increase in the internal resistance of the fuel cell. It is also difficult to produce an electrode containing an increased amount of supported catalyst. Therefore, it is essential to maintain constant the amount of the support used, while increasing the concentration of the catalytic metal to be supported. However, before preparing a supported catalyst having a high concentration of catalytic metal, it is necessary to achieve a high degree of dispersion of catalytic metal particles by preparing very fine particles. The supported platinum catalysts that are currently in use have a loading concentration of 20 to 30% by weight, and it is reported (E. Antolini et al., *Materials Chemistry and Physics,* 78, 563 (2003)) that in the case of commercial catalysts marketed by E-TEK, Inc., when the concentration of Pt metal particles in the supported catalyst is increased from 20% by weight to 60% by weight, the size of the Pt metal particles also increases by approximately four times. Thus, the effect of increasing the loading concentration cannot be fully utilized when such supported catalysts are actually used in fuel cells.

U.S. Pat. No. 5,068,161 discloses a method of preparing a supported catalyst containing a platinum alloy by a solvent reduction technique, in which an excess amount of water is used as a solvent to dissolve a catalytic metal precursor, hexachloroplatinic acid ($H_2PtCl_6$). Subsequently, formaldehyde is used as a reducing agent to reduce the catalytic metal precursor, and the resulting reduction product is filtered and dried in a vacuum.

However, this method involving solvent reduction is disadvantageous in that the size of the catalytic metal particles varies depending on the type of the reducing agent, and the size of the catalytic metal particles also becomes too large at high loading concentrations of 30% by weight or greater.

In another method of preparing a carbon-supported catalyst, a catalytic metal precursor is dissolved in an excess amount of a solvent, a carbon support is impregnated with the catalytic metal precursor, the solvent is removed by drying, and then the catalytic metal precursor loaded onto the carbon support is reduced using hydrogen gas (H. Wendt, *Electrochim. Acta,* 43, 3637 (1998)). According to this method, since the solvent is added in an excess amount, a concentration gradient is generated in the process of drying, and since the concentration gradient induces a capillary phenomenon, a discharge of the catalytic metal precursor may occur onto the pore surfaces of the carbon support. Also, there still remains a problem that the size of the catalytic metal particles increases as the loading concentration increases. Moreover, it is still necessary to correlate the performance of MEAs with the increased activity of such supported catalysts.

SUMMARY OF THE INVENTION

An aspect of the present invention provides a supported catalyst in which a large concentration of catalytic metal particles are supported on a carbon support to maximize the performance of a fuel cell employing the supported catalyst, while the size of the catalytic metal particles dispersed on the carbon support is maintained uniform and very small, and a method of preparing the supported catalyst.

Another aspect of the present invention also provides a fuel cell which employs the supported catalyst and exhibits improved performance.

According to an aspect of the present invention, there is provided a method of preparing a supported catalyst, the method comprising: mixing a first catalytic metal precursor and a first solvent to obtain a first catalytic metal precursor mixture; mixing a carbon catalyst support and the first catalyst metal precursor mixture and drying the resulting mixture to obtain a primary supported catalyst precursor; subjecting the primary supported catalyst precursor to a hydrogen reduction heat treatment to obtain a primary supported catalyst; mixing the primary supported catalyst and a polyhydric alcohol to obtain a primary supported catalyst mixture; mixing a second catalytic metal precursor and a second solvent to obtain a second catalytic metal precursor mixture; mixing the primary supported catalyst mixture obtained in and the second catalytic metal precursor mixture to obtain a secondary supported catalyst precursor mixture; and adjusting the pH of the secondary supported catalyst precursor mixture, and heating the secondary supported catalyst precursor mixture to obtain a supported catalyst.

According to another aspect of the present invention, there is provided a supported catalyst prepared by the method.

According to an aspect of the present invention, the supported catalyst may contain catalytic metal particles having an average particle size of 1 to 5 nm, and the catalytic metal particles may be contained in the supported catalyst in an amount of 40 to 90% by weight of the supported catalyst.

According to another aspect of the present invention, there is provided an electrode containing the supported catalyst.

According to another aspect of the present invention, there is provided a fuel cell which includes the electrode containing the supported catalyst.

Additional aspects and/or advantages of the invention will be set forth in part in the description which follows and, in part, will be obvious from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE EMBODIMENTS

Figure 1:
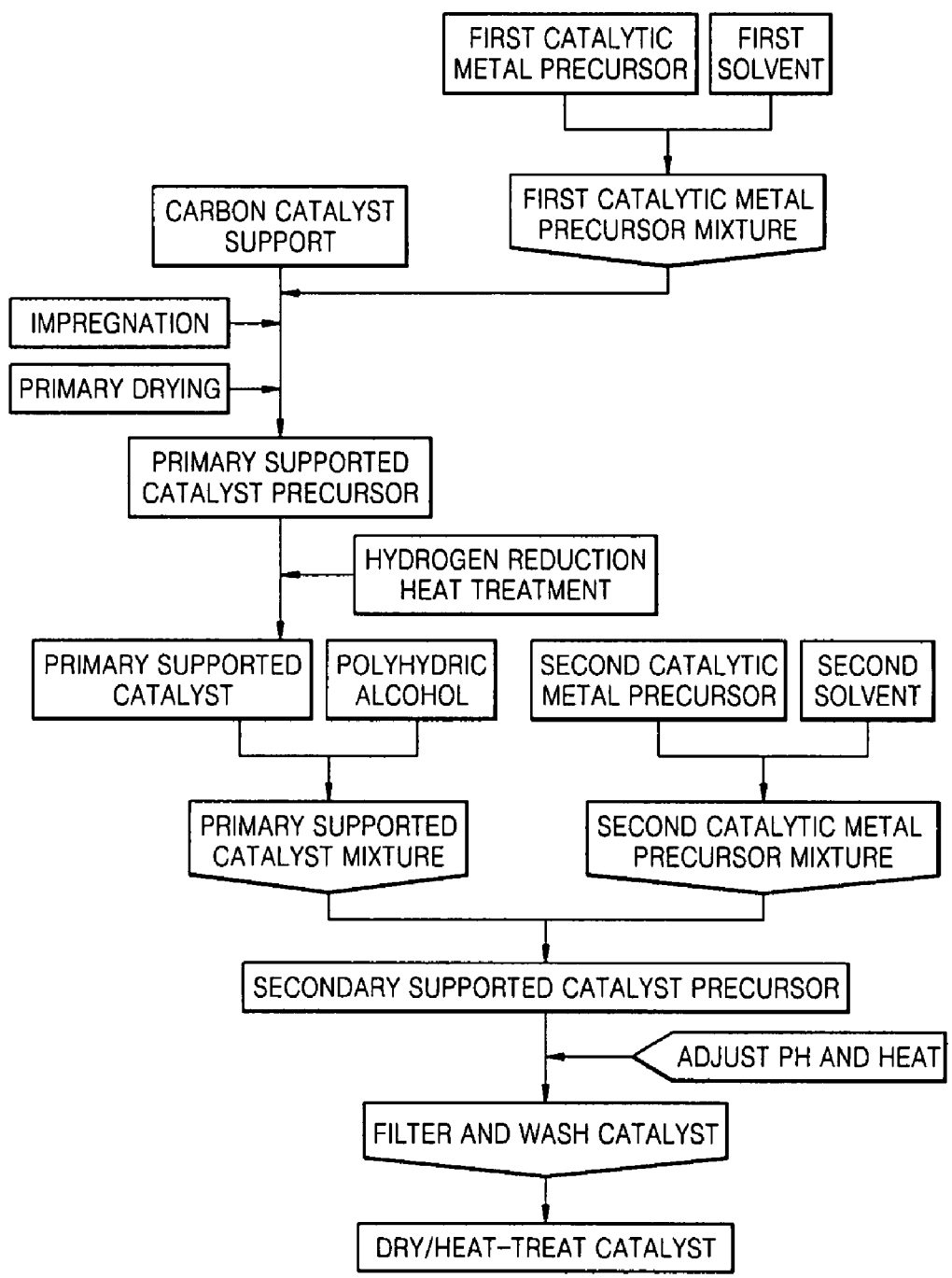
FIG. 1 is a flow diagram illustrating a process for preparing a supported catalyst according to an embodiment of the present invention.

Reference will now be made in detail to the present embodiments of the present invention, examples of which are illustrated in the accompanying drawings, wherein like reference numerals refer to the like elements throughout. The embodiments are described below in order to explain the present invention by referring to the figures.

An embodiment of the present invention provides a method of preparing a supported catalyst with a high degree of dispersion, by preparing a primary supported catalyst containing catalytic metal particles, which are obtained by a primary gas phase reduction reaction of a portion of the final loading amount of catalytic metal, and reducing the remaining portion of the catalytic metal by a secondary liquid phase reduction reaction using the primary supported catalyst. According to this embodiment, a supported catalyst having an excellent degree of dispersion can be prepared by dividing the total amount of the catalytic metal precursor into two portions, and loading the divided portions of catalytic metal precursor successively on a porous carbon support while subjecting the two portions of the catalytic metal precursor to two separate reduction reactions of different reduction modes, so as to form catalytic metal particles having a small average particle size on a carbon support having a large pore volume.

That is, the first loaded portion of the catalytic metal precursor particles is first subjected to a primary gas phase reduction reaction to form catalytic metal particles having a small average particle size within the micropores or mesopores of the carbon support, and the second loaded portion of the catalytic metal precursor particles is then subjected to a secondary liquid phase reduction reaction so that relatively more of the catalytic metal particles resulting from this liquid phase reaction are formed on the surface of the carbon support. Thus, a supported catalyst having catalytic metal particles with a small average particle size loaded on the support surface in a large loading amount can be obtained.

According to an embodiment of the present invention, the carbon support has micropores or mesopores having a diameter of 0.5 to 50 nm, and the catalytic metal particles have an average particle size of 1 to 5 nm.

FIG. 1 is a diagram illustrating a process for preparing a supported catalyst according to an embodiment of the present invention. Referring to FIG. 1, the method of preparing a supported catalyst by sequentially conducting a gas phase reduction reaction and a liquid phase reduction reaction is performed as described below.

First, a first catalytic metal precursor and a first solvent are mixed to obtain a first catalytic metal precursor mixture. The first catalytic metal precursor may be a salt containing at least one metal selected from the group consisting of platinum (Pt), ruthenium (Ru), palladium (Pd), rhodium (Rh), iridium (Ir), osmium (Os) and gold (Au). Examples of the platinum precursor include tetrachloroplatinic acid ($H_2PtCl_4$), hexachloroplatinic acid ($H_2PtCl_6 \cdot xH_2O$), potassium tetrachloroplatinate ($K_2PtCl_4$), potassium hexachloroplatinate ($K_2PtCl_6$), and mixtures thereof. Examples of the ruthenium precursor include ammonium hexachlororuthenate [$(NH_4)_2RuCl_6$], ammonium aquopentachlororuthenate {$(NH_4)_2[RuCl_5(H_2O)]$}, ruthenium trichloride ($RuCl_3 \cdot xH_2O$) and the like, while examples of the gold precursor include hydrogen tetrachloroaurate ($H_2AuCl_4$), ammonium tetrachloroaurate [$(NH_4)_2AuCl_4$], hydrogen tetranitroaurate [$HAu(NO_3)_4 \cdot H_2O$] and the like. In the case of using metal alloys, a precursor mixture having a mixing ratio corresponding to the ratio of the metal atoms contained in the alloy is used.

The first catalytic metal precursor may be contained in the first catalytic metal precursor mixture in an amount of 20 to 40% by weight of the first catalytic metal precursor mixture. When the amount of the first catalytic metal precursor is more than 40% by weight, catalytic metal particles will be formed inside as well as outside the pores of the carbon support, and thus, the catalytic metal particles grow in size or have a non-uniform particle size distribution. When the amount of the first catalytic metal precursor is less than 20% by weight, very small catalytic metal particles are formed inside the support pores, so that the catalyst utilization may be lowered.

As the first solvent, acetone, methanol, ethanol and the like may be used. The solvent may be used in an amount of 60 to 80% by weight of the first catalytic metal precursor mixture.

Subsequently, a carbon support for a catalyst and the first catalytic metal precursor mixture are mixed, and then the resulting mixture is dried to obtain a primary supported catalyst precursor. The carbon support may be, but is not limited to, a porous carbon support having a specific surface area of 250 $m^2$/g or greater, such as 500 to 1200 $m^2$/g. If the specific surface area is smaller than 250 $m^2$/g, the carbon support may have an insufficient loading capacity for catalytic metal particles.

Examples of the carbon supports which satisfy these conditions include carbon black, Ketjen black (KB), acetylene black, activated carbon powder, carbon molecular sieves, carbon nanotubes, microporous activated carbon, and ordered mesoporous carbon (OMC) or mesoporous carbon (MC), and one or more selected from the group consisting thereof may be used. In particular, it is preferable to use the ordered mesoporous carbon (OMC), which has an average pore size of 2 to 10 nm.

The proportion of the carbon support in the primary supported catalyst will be appropriately adjusted such that the amount of the catalytic metal particles contained in the primary supported catalyst is 25 to 45% by weight of the primary supported catalyst. It is desirable to use 30 to 40% by weight of the primary supported catalyst, for maximum dispersion and catalyst utilization of the supported catalyst.

The drying temperature in the process of primary drying may be from ambient temperature (approximately 25° C.) to 50° C., and in particular, the ambient temperature (approximately 25° C.).

Subsequently, the primary supported catalyst precursor is subjected to hydrogen reduction heat treatment to obtain the primary supported catalyst. The temperature for the hydrogen reduction heat treatment may be 100 to 300° C. If the temperature for the hydrogen reduction heat treatment is below 100° C., the rate of the catalyst reduction reaction becomes so slow that reduction may not be completely achieved, leading to incomplete formation of catalytic metal particles. If the temperature is above 300° C., the rate of the catalyst reduction reaction becomes so fast that aggregation of the catalytic metal particles may occur, resulting in undesirable, large-sized catalytic metal particles.

The amount of the catalytic metal particles contained in the primary supported catalyst obtained as described above may be 25 to 45% by weight of the primary supported catalyst.

The primary supported catalyst is then mixed with a polyhydric alcohol to obtain a primary supported catalyst mixture. For the polyhydric alcohol, ethylene glycol, diethylene glycol, triethylene glycol and the like may be used, and the ratio of the polyhydric alcohol to is the primary supported catalyst ranges from 30:1 by weight to 520:1 by weight of the primary supported catalyst. When the ratio of the polyhydric alcohol to the primary supported catalystis less than 30:1 by weight, the catalytic metal particles tend to aggregate during the reduction reaction, thereby forming large-sized particles. When the ratio of the polyhydric alcohol to the primary supported catalystis greater than 520:1 by weight, the reduction reaction cannot take place on the surface of the carbon support, and the primary supported catalyst remains in colloidal form in the polyhydric alcohol, in which case further catalyst production is inhibited.

Meanwhile, in a separate process, a second catalytic metal precursor and a second solvent are mixed to obtain a second catalytic metal precursor mixture. As the second catalytic metal precursor, a salt containing at least one metal selected from the group consisting of platinum (Pt), ruthenium (Ru), palladium (Pd), rhodium (Rh), iridium (Ir), osmium (Os) and gold (Au) may be used, as in the case of the first catalytic metal precursor. Example of the platinum precursor include tetrachloroplatinic acid ($H_2PtCl_4$), hexachloroplatinic acid ($H_2PtCl_6 \cdot xH_2O$), potassium tetrachloroplatinate ($K_2PtCl_4$), potassium hexachloroplatinate ($K_2PtCl_6$), and mixtures thereof. Examples of the ruthenium precursor include ammonium hexachlororuthenate [$(NH_4)_2RuCl_6$], ammonium aquopentachlororuthenate {$(NH_4)_2[RUCl_5(H_2O)]$}, ruthenium trichloride ($RuCl_3 \cdot xH_2O$) and the like, while examples of the gold precursor include hydrogen tetrachloroaurate ($H_2AuCl_4$), ammonium tetrachloroaurate [$(NH_4)_2AuCl_4$], hydrogen tetranitroaurate [$HAu(NO_3)_4 \cdot H_2O$] and the like. In the case of using metal alloys, a precursor mixture having a mixing ratio corresponding to the ratio of the metal atoms contained in the alloy is used.

As the second solvent, water, polyhydric alcohols and the like may be used.

Thereafter, the primary supported catalyst mixture previously obtained and the second catalytic metal precursor are mixed to obtain a secondary supported catalyst precursor mixture.

The second catalytic metal precursor mixture contains the second catalytic metal precursor in an amount of 0.2 to 0.8% by weight, in particular, 0.40 to 0.55% by weight of the total reaction mixture. If the amount of the second catalytic metal precursor is less than 0.40% by weight, the amount of total solution is increased, and thus, catalytic metal particles will not be formed onto the carbon support but will exist in the form of colloidal particles in the solvent. When the amount of the second catalytic metal precursor exceeds 0.55% by weight, the amount of solution is insufficient to reduce the second metal precursor, and thus the second catalytic metal particles become undesirably large.

The secondary supported catalyst precursor mixture may contain water in an amount of 30 to 70% by weight of the total solvent (water+polyhydric alcohol). If the amount of water is less than 30% by weight, the reducing power of the catalytic metal ions, such as Pt ions, is decreased, and large-sized particles are formed. If the amount of water is greater than 70% by weight, the reducing power of the catalytic metal ions is increased, and numerous small-sized particles will be formed, which will finally undergo aggregation.

The pH of the secondary supported catalyst precursor mixture obtained as described above is adjusted, and then the secondary supported catalyst precursor mixture is heated to obtain a supported catalyst.

The pH of the secondary supported catalyst precursor mixture is adjusted to 7 to 14, for example, from 9 to 13, and then, the secondary supported catalyst precursor mixture is heated. When the pH of the mixture is lower than 9, the catalytic metal particles, such as Pt particles, form a colloid in the secondary supported catalyst precursor mixture, and no supported catalyst is formed. When the pH of the mixture is higher than 13, the catalytic metal particles undergo aggregation on the surface of the carbon support, and undesirably large-sized particles are generated.

The heating temperature may be 90 to 115° C., such as 105 to 110° C., and the heating rate may be 1 to 20° C./min, such as 1.5 to 5° C./min. If the heating temperature is below 90° C., the catalytic metal particles do not undergo complete reduction. If the heating temperature is higher than 115° C., sudden boiling of the reaction solution occurs, and the amount of water in the reaction solution changes so that the size of the catalytic metal particles undesirably increases. Furthermore, if the heating rate is less than 1.5° C./min, the rate of generation of the catalytic metal particles, such as Pt particles, is lowered, and the size of the catalytic metal particles increases. If the heating rate exceeds 5° C./min, very small catalytic metal particles will be prepared and undergo aggregation, which is not desirable.

Under the conditions described above, the resulting product is cooled to ambient temperature (about 25° C.), and then is subjected to a series of work-up processes, including filtering, washing and freeze-drying, to finally obtain the supported catalyst of this embodiment of the present invention.

According to the current embodiment, a supported catalyst comprising a carbon support and catalytic metal particles supported on the carbon support can be obtained. Such a supported catalyst contains the catalytic metal particles in an amount of 40 to 90% by weight and the carbon support in an amount of 10 to 60% by weight of the supported catalyst. The average particle size of the catalytic metal particles is 1 to 5 nm.

A supported catalyst provided according to an embodiment of the present invention may contain catalytic metal particles supported on a carbon support in a high loading amount, such as 40 to 90% by weight of the supported catalyst. In this case, a portion of the total loading amount of the catalytic metal particles, such as 20 to 45% by weight, is loaded by the primary gas phase reduction reaction, and the remaining portion, namely, 20 to 70% by weight, is loaded by the secondary liquid phase reduction method. The reason for dividing the loading amount into two portions is that the loading of catalytic metal particles by means of the primary gas phase reduction reaction is intended to load the catalytic metal particles inside the internal pores of the carbon support so as to reduce the size of the catalytic metal particles, while the loading of catalytic metal particles by means of the secondary gas phase reduction reaction is intended to load the catalytic metal particles onto the external surface of the carbon support so that both operations increase the catalyst utilization. This mixed mode of loading allows the production of a catalyst having a high concentration of catalytic metal particles highly dispersed.

The supported catalyst according to this current embodiment of the present invention can be applied to the catalyst layers of the membrane electrode assembly in fuel cells.

Figure 2:
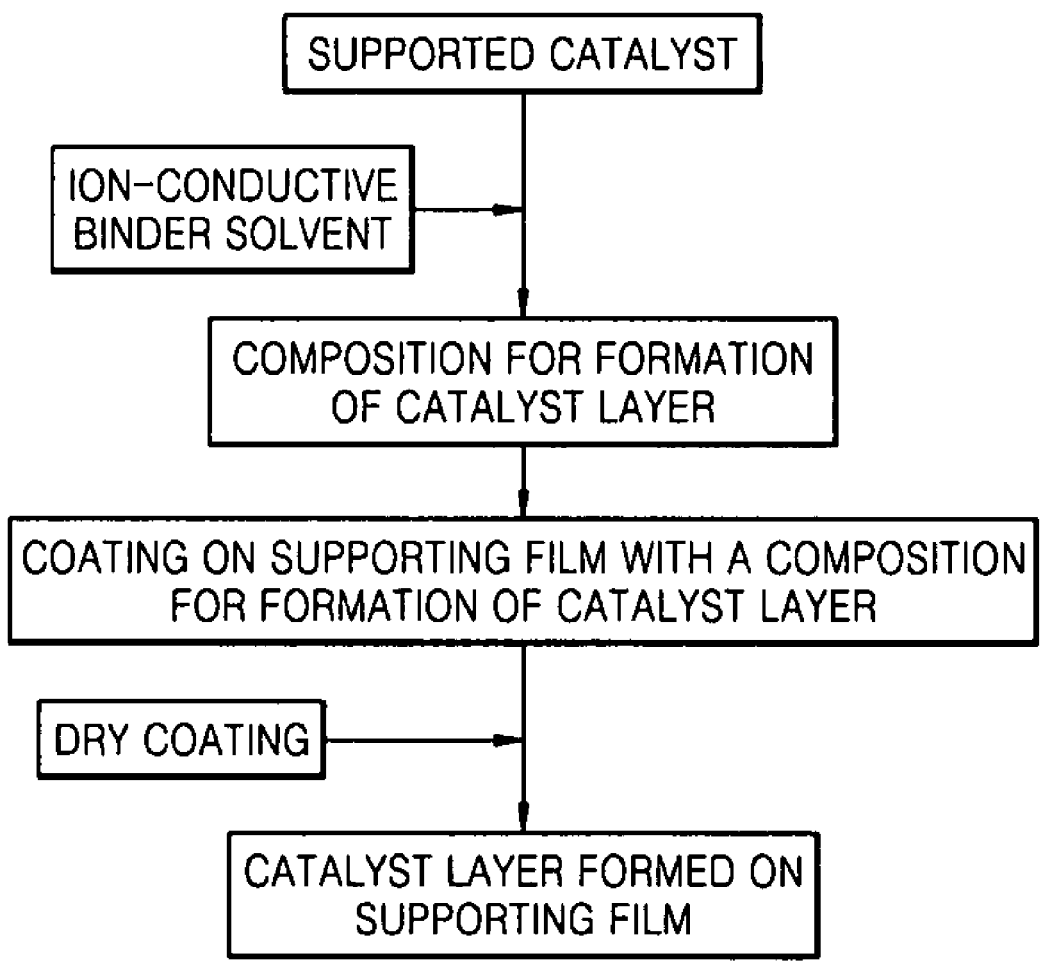
FIG. 2 is a flow diagram illustrating a process for producing an electrode catalyst layer according to an embodiment of the present invention.

FIG. 2 is a diagram illustrating a process for producing an electrode catalyst layer according to an embodiment of the present invention. First, the supported catalyst prepared according to the previously described embodiment of the present invention is mixed with a solvent and an ion-conductive binder to obtain a composition for forming a catalyst layer. This composition for forming the catalyst layer is coated onto a supporting film and dried to form an electrode catalyst layer on the supporting film.

The electrode catalyst layer formed on the supporting film is laminated onto an electrolyte membrane, and the supporting film is peeled off from the resulting laminate. When the process is performed for both the cathode catalyst layer and the anode catalyst layer, a complete catalyst coated membrane (CCM) is obtained.

As the supporting film, polyethylene film (PE film), polyethylene terephthalate film (for example, MYLAR®), polytetrafluoroethylene film (PTFE, for example, TEFLON®), polyimide film (for example, KAPTON®), and the like are used. Conventional coating methods such as bar coating, spray coating, screen printing, and the like may be used.

As the solvent in the composition for forming the electrode catalyst layer, water, ethylene glycol, isopropyl alcohol, and polyalcohols can be used, and such a solvent may be used in an amount of 1.5:1 to 2.5:1 by weight of the supported catalyst.

Various ionomers may be used as the ion-conductive binder. A representative example thereof is a sulfonated, highly fluorinated polymer (e.g., NAFION® manufactured by DuPont Corp.) having a main chain composed of fluorinated alkylene and side chains composed of fluorinated vinyl ether and sulfonic acid groups at the terminals, and other polymeric materials having similar properties can be also used as the ion-conductive binder. The ion-conductive binder is dispersed in a mixed solvent of water and alcohol, for example, with 5 to 30% by weight of the mixed solvent. The amount of ion-conductive binder in the catalyst layer at the final stage is 5 to 50% by weight of the supported catalyst.

The electrode catalyst layer produced according to this current embodiment of the present invention can be formed on a supporting film as illustrated in FIG. 2, but it is also possible to form an electrode catalyst layer by coating and drying the composition for forming the catalyst layer directly onto the electrolyte membrane.

The supported catalyst according to embodiments of the present invention can also be used as a catalyst for various chemical reactions such as, for example, hydrogenation, dehydrogenation, coupling, oxidation, isomerization, decarboxylation, hydrocracking, and alkylation.

Hereinafter, a fuel cell according to an embodiment of the present invention, which uses the supported catalyst this embodiment of the present invention, will be described, and in particular, a direct methanol fuel cell will be described.

Figure 3:
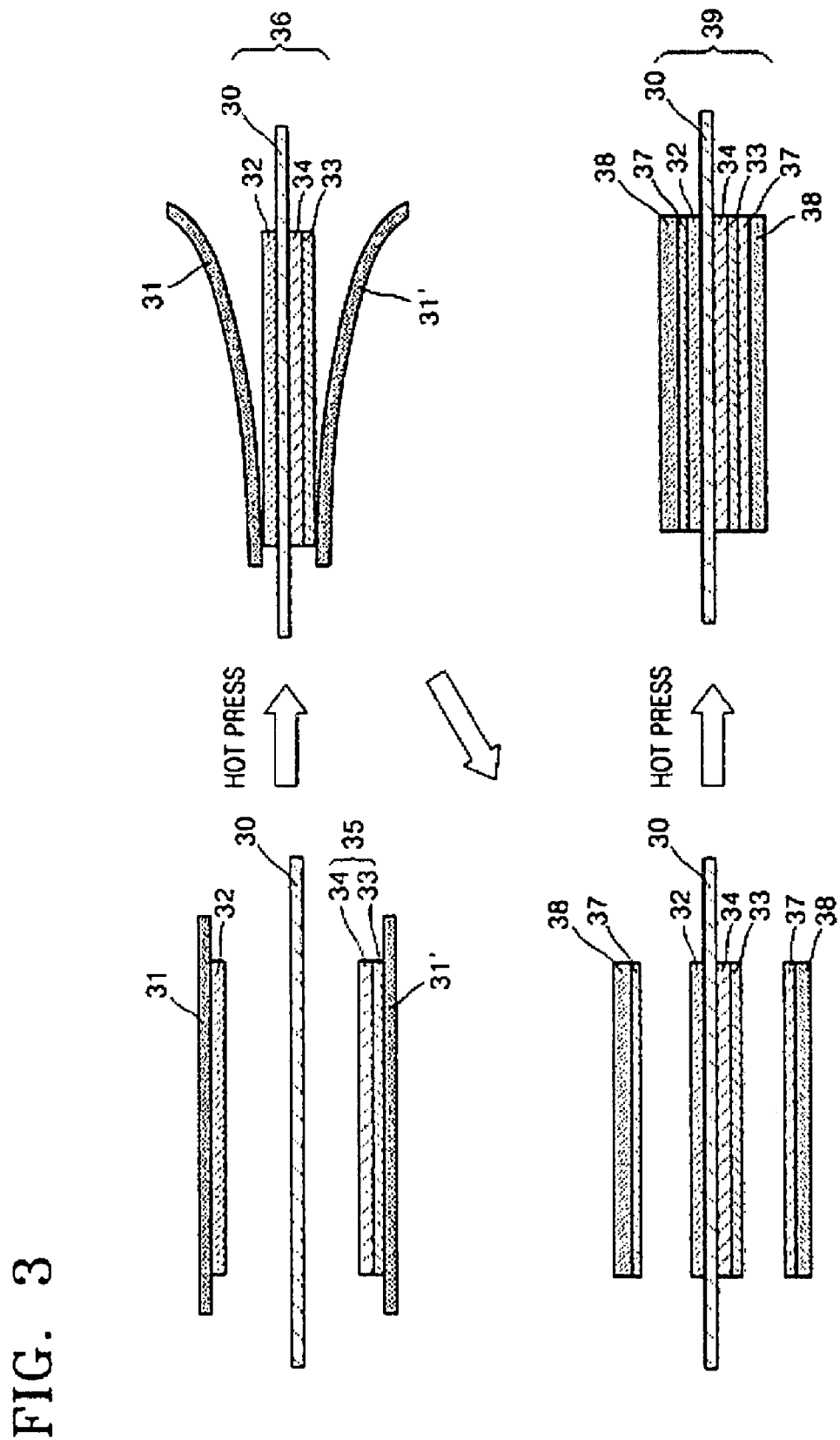
FIG. 3 is a diagram illustrating a process for producing a membrane electrode assembly (MEA) according to an embodiment of the present invention.

FIG. 3 is a diagram illustrating processes for producing a catalyst coated membrane (CCM) and a membrane electrode assembly (MEA), which together constitute a direct methanol fuel cell according to an embodiment of the present invention.

Referring to FIG. 3, a cathode catalyst layer 32 formed onto a supporting film 31 is disposed on the upper side of an electrolyte membrane 30, and a bilayered anode catalyst layer 35 formed onto a supporting film 31' is disposed on the lower side of the electrolyte membrane 30. As an example of the cathode catalyst layer 32, a catalyst layer containing a mesoporous carbon-supported platinum catalyst (Pt/MC) supported catalyst can be used, and as an example of the anode catalyst layer 35, a sequentially-laminated-bilayered-catalyst layer consisting of an anodic non-supported catalyst layer 34 composed of a metallic catalyst, such as a PtRu black layer, and an anodic supported catalyst layer 33, such as a mesoporous carbon-supported platinum-ruthenium catalyst (PtRu/MC) layer, can be used. In this case, the PtRu black layer 34 is disposed adjacent to the electrolyte membrane 30.

The resulting assembly is then hot pressed, and the supporting films 31 and 31' are peeled off from the cathode catalyst layer 32 and the anode catalyst layer 35, respectively, to obtain a four-layered catalyst coated membrane 36. Here, the process of hot pressing is performed at a temperature of 80 to 150° C. and at a pressure of 2 to 10 tons for 1 to 20 minutes. For example, the process of hot pressing may be performed at 125° C. and at about 5 tons for 10 minutes. When hot pressing is performed under such conditions, there is an advantage in that the binding strength between the layers constituting the CCM is enhanced.

Subsequently, a cathode diffusion layer 37 and a backing layer 38 are sequentially located onto the cathode catalyst layer 32, and an anode diffusion layer 37' and a backing layer 38' are sequentially laminated onto the supported catalyst layer 33 of the anode catalyst layer 35.

The resulting assembly is hot pressed again to obtain an eight-layered MEA 39. Here, the process of hot pressing is performed at a temperature of 80 to 150° C. and at a pressure of 2 to 10 tons for 1 to 20 minutes. When hot pressing is performed as described above, the binding strength between the diffusion layers and the catalyst layers is enhanced, thereby the electrical resistance can be decreased, and the MEA can be firmly integrated.

While FIG. 3 illustrates an eight-layered MEA, it is also possible to produce a trilayered CCM formed using a single-layered supported catalyst layer as the anode catalyst layer, and a seven-layered MEA employing the trilayered CCM.

The backing layers 38 and 38' shown in FIG. 3 may be formed from a porous material such as carbon paper and carbon cloth, and carbon paper is mainly used according to an embodiment of the present invention.

As an exemplary material for the electrolyte membrane 30, cation-exchangeable polymer electrolyte, such as a sulfonated, highly fluorinated polymer (e.g., NAFION® manufactured by DuPont Corp.) having a main chain composed of fluorinated alkylene, and side chains composed of fluorinated vinyl ether and sulfonic acid groups at the terminals, is used.

Figure 4:
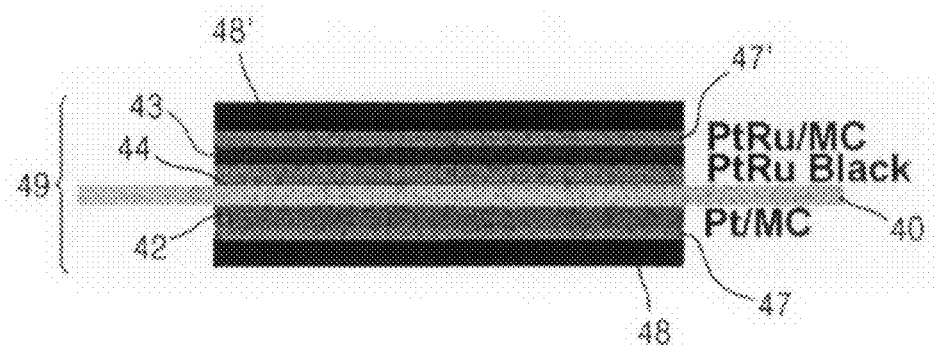
FIG. 4 is a diagram illustrating a laminate structure of an eight-layered MEA according to an embodiment of the present invention

FIG. 4 is a diagram illustrating the structure of an eight-layered MEA according to an embodiment of the present invention.

Referring to FIG. 4, the eight-layered MEA 49 has a structure in which an anode catalyst layer 45 including an anodic first catalyst layer 44 composed of a non-supported catalyst, PtRu black, and an anodic second catalyst layer 43 composed of a supported catalyst, PtRu/MC, is laminated onto one side of the electrolyte membrane 40, and an anode diffusion layer 47' and carbon paper 48' as a backing layer are sequentially disposed on top of the anodic second catalyst layer.

On the other side of the electrolyte membrane 40, a cathode catalyst layer 42 composed of a supported catalyst, Pt/MC, and a cathode diffusion layer 47 and carbon paper 48 as a backing layer are sequentially disposed underneath the cathode catalyst layer 42.

The thickness of the anodic first catalyst layer 44 and the anodic second catalyst layer 43 may be 10 to 40 μm each, while the ratio of the thickness of the anodic first catalyst layer 44 and the thickness of the anodic second catalyst layer 43 may range from 2:1 to 1:2. If the thickness of the anodic first catalyst layer or the anodic second catalyst layer is larger than 40 μm, supply of the reactants will not be easily achieved. If the ratio of the thickness of the anodic first catalyst layer and the anodic second catalyst layer is out of the aforementioned range, the balance between the rate of fuel supply and the electrical resistance of the entire catalyst layers may be broken, and an optimal performance may not be shown.

The thickness of the cathode catalyst layer may be 10 to 80 nm.

Hereinafter, the present invention will be described with reference to the following Examples, but the present invention is not intended to be limited by these Examples.

EXAMPLE 1

0.89 g of hexachloroplatinic acid ($H_2PtCl_6 \cdot xH_2O$) and 0.40 g of ruthenium chloride ($RuCl_3 \cdot xH_2O$), which are catalytic metal precursors, were respectively dissolved in 2.5 ml of acetone and mixed to obtain a corresponding catalytic metal precursor mixture, and then 1 g of mesoporous carbon in a plastic bag was impregnated with the catalytic metal precursor mixture. The impregnated carbon support was placed in an electric furnace and subjected to a gas phase reduction reaction under a hydrogen gas stream to prepare a supported catalyst loaded with 35% by weight of PtRu (primary supported catalyst).

0.769 g of the primary supported catalyst was added to 400 g of ethylene glycol to prepare a primary supported catalyst mixture. Then, 1.516 g of hexachloroplatinic acid ($H_2PtCl_6 \cdot xH_2O$) and 0.740 g of ruthenium chloride ($RuCl_3 \cdot xH_2O$), these amounts making the loading amount of the final catalytic metal to be 70% by weight of the catalytic metal, were dissolved in 200 g of triple-distilled water, and the resulting solution was added to the primary supported catalyst mixture. The pH of the resulting mixture was adjusted to 13, and then the mixture was heated to 110° C. to reduce the newly supplied catalytic metal ions in the solution phase.

The supported catalyst obtained as described above was filtered, washed with triple-distilled water, and freeze-dried to prepare a PtRu/C supported catalyst containing 70% by weight of PtRu.

In Example 1, a PtRu/MC supported catalyst containing 35% by weight of PtRu was obtained by a primary gas phase reduction reaction, and a PtRu/MC supported catalyst containing 35% by weight of PtRu was obtained by a secondary liquid phase reduction reaction. Thus, the total loading amount of PtRu in the finally obtained supported catalyst was 70% by weight.

EXAMPLE 2

1.08 g of hexachloroplatinic acid ($H_2PtCl_6 \cdot xH_2O$), which is a catalytic metal precursor, was dissolved in 6 ml of acetone to obtain a corresponding catalytic metal precursor mixture. Then, 1 g of mesoporous carbon in a plastic bag was impregnated with the catalytic metal precursor mixture. The impregnated carbon support was placed in an electric furnace and subjected to a gas phase reduction reaction under a hydrogen gas stream to prepare a supported catalyst loaded with 30% by weight of Pt (primary supported catalyst).

1.43 g of the primary supported catalyst was added to 260 g of ethylene glycol to prepare a primary supported catalyst mixture. Then, 2.692 g of hexachloroplatinic acid ($H_2PtCl_6 \cdot xH_2O$), this amount making the loading amount of the final catalytic metal to be 60% by weight of the catalytic metal, was dissolved in 300 g of triple-distilled water, and the resulting solution was added to the primary supported catalyst mixture. The pH of the resulting mixture was adjusted to 11, and then the mixture was heated to 110° C. to reduce the newly supplied catalytic metal ions in the solution phase.

The supported catalyst obtained as described above was filtered, washed, and freeze-dried to prepare a 60 wt % Pt/MC supported catalyst.

In Example 2, a Pt/MC supported catalyst containing 30% by weight of Pt was obtained by a primary gas phase reduction reaction, and a Pt/MC supported catalyst containing 30% by weight of Pt was obtained by a secondary liquid phase reduction reaction, was obtained. Thus, the total loading amount of Pt in the finally obtained supported catalyst was 60% by weight.

COMPARATIVE EXAMPLE 1

1 g of hexachloroplatinic acid ($H_2PtCl_6 \cdot xH_2O$) and 0.474 g of ruthenium chloride ($RuCl_3 \cdot xH_2O$), which are catalytic metal precursors, were dissolved in 100 g of triple-distilled water to obtain a corresponding catalytic metal precursor mixture, and then this catalytic metal precursor mixture was mixed with a carbon support mixture, in which mesoporous carbon was dispersed in ethylene glycol. The pH of the resulting mixture was adjusted to 13, and the mixture was heated to 110° C. to reduce the catalytic metal ions in the solution phase.

The supported catalyst obtained as described above was filtered, washed using a centrifuge, and freeze-dried to prepare a 70 wt % PtRu/MC supported catalyst.

In Comparative Example 1, a PtRu/MC supported catalyst containing 70% by weight of PtRu was obtained by a primary liquid phase reduction reaction.

COMPARATIVE EXAMPLE 2

1.8844 g of hexachloroplatinic acid ($H_2PtCl_6 \cdot H_2O$), which is a catalytic metal precursor, was dissolved in 6 ml of acetone to obtain a corresponding catalytic metal precursor mixture, and then 1 g of mesoporous carbon in a plastic bag was impregnated with the catalytic metal precursor mixture. The impregnated carbon support was placed in an electric furnace and was subjected to a gas phase reduction reaction under a hydrogen gas stream to prepare a 47.5 wt % Pt/MC supported catalyst. Then, 1.8844 g of hexachloroplatinic acid ($H_2PtCl_6 \cdot xH_2O$) was dissolved in 6 ml of acetone to obtain a corresponding catalytic metal precursor mixture. The Pt/MC catalyst prepared as described above was placed in a plastic bag and was impregnated again with the secondary catalytic metal precursor mixture. The impregnated Pt/MC catalyst was placed in an electric furnace under a hydrogen gas stream to subject the newly supplied catalytic metal ions to secondary reduction in the gas phase, to finally prepare a 60 wt % Pt/MC catalyst.

COMPARATIVE EXAMPLE 3

1 g of mesoporous carbon was dispersed in 400 g of water and 40 g of ethylene glycol. 3.7688 g of a catalytic metal precursor, hexachloroplatinic acid, was dissolved in 360 g of ethylene glycol to obtain a catalytic metal precursor mixture. The catalytic metal precursor mixture was then mixed with the dispersion of mesoporous carbon for 10 minutes. The pH of the resulting mixture was adjusted to 11, and the mixture was heated to reduce the catalytic metal ions in the solution phase.

The supported catalyst thus obtained was filtered, washed and dried to prepare a 60 wt % Pt/MC supported catalyst.

EXAMPLE 3

1.5 g of the 70 wt % PtRu/MC supported catalyst obtained in Example 1 was mixed with 2 g of deionized water, 1 g of ethylene glycol and 2.25 g of a 20 wt % NAFION® ionomer solution to prepare a slurry for forming a catalyst layer.

A polyethylene film was bar coated with the slurry to form a catalyst layer with a thickness of about 30 μm, and then the coating was dried in a vacuum oven at 80° C. to form a 70 wt % PtRu/MC supported catalyst layer.

Subsequently, a PtRu black non-supported catalyst layer was formed on the 70 wt % PtRu/MC supported catalyst layer to form an anode catalyst layer. Here, the PtRu black non-supported catalyst layer was formed as described below.

3 g of PtRu black was mixed with 3 g of deionized water, 2 g of ethylene glycol and 1.875 g of a 20 wt % NAFION® ionomer solution to prepare a slurry for forming a catalyst layer. The 70 wt % PtRu/MC supported catalyst layer was coated with this slurry for forming a catalyst layer, and then the coating was dried.

In a separate process, 1.667 g of the 60 wt % Pt/MC supported catalyst obtained in Example 2 was mixed with 1.2 g of deionized water, 2.5 g of ethylene glycol and 2.5 g of a 20 wt % NAFION® ionomer solution to prepare a slurry for forming a catalyst layer.

A polyethylene film was bar coated with this slurry for forming a catalyst layer, and the coating was dried at 120° C. to form a 60 wt % Pt supported catalyst layer. Thus, a cathode catalyst layer was provided.

The anode catalyst layer and the cathode catalyst layer obtained as described above were respectively disposed on the two sides of an electrolyte membrane, and then the polyethylene films were peeled off from the cathode catalyst layer and the anode catalyst layer.

The resulting assembly was subsequently hot pressed at a temperature of 125° C. and at a pressure of 6 tons for 10 minutes to form a four-layered catalyst coated membrane (CCM). The CCM thus produced was further provided with a cathode diffusion layer and an anode diffusion layer, each formed onto carbon paper, and then the whole assembly was hot pressed at a temperature of 125° C. for 3 minutes to produce an eight-layered membrane electrode assembly (MEA).

EXAMPLE 4

A membrane electrode assembly was produced in the same manner as in Example 3, except that the anode catalyst layer was produced from a PtRu black non-supported catalyst.

A PtRu black non-supported catalyst layer was formed to be used as the anode catalyst layer. Here, the PtRu black non-supported catalyst layer was produced as described below.

3 g of PtRu was mixed with 3 g of deionized water, 2 g of ethylene glycol and 1.875 g of a 20 wt % NAFION® ionomer solution to prepare a slurry for forming a catalyst layer. A polyethylene film was coated with the slurry, and the coating was dried.

The anode catalyst layer thus obtained and a cathode catalyst layer produced in the same manner as in Example 3 were respectively disposed on each of the two sides of an electrolyte membrane, and then polyethylene films were peeled off from the cathode catalyst layer and the anode catalyst layer.

The resulting assembly was hot pressed at a temperature of 125° C. and at a pressure of 6 tons for 10 minutes to form a four-layered CCM. The CCM thus produced was further provided with a cathode diffusion layer and an anode diffusion layer, each formed onto carbon paper, and then the whole assembly was hot pressed at a temperature of 125° C. for 3 minutes to produce a seven-layered MEA.

COMPARATIVE EXAMPLE 4

A membrane electrode assembly (MEA) was produced in the same manner as in Example 3, except that the PtRu black non-supported catalyst layer produced in the same manner as in Example 4 was used as the anode catalyst layer, and a catalyst layer formed from a Pt black non-supported catalyst was used as the cathode catalyst layer.

For the supported catalysts prepared in Example 1 and Comparative Example 1, the size of PtRu crystals, the size of PtRu particles, and the methanol oxidation activity were measured, and the results are presented in Table 1 below. X-ray diffraction analysis spectra of the supported catalysts are shown in FIG. 5.

The supported catalysts of Example 1 and Comparative Example 1 were respectively mounted on an operating electrode, and the methanol oxidation activity of the supported catalysts was measured using platinum as a counter electrode and Ag/AgCl as a reference electrode. A voltage of 0 to 0.8 V (vs. a normal hydrogen electrode or NHE) was applied in a 0.5 M aqueous solution of sulfuric acid and a 2 M aqueous solution of methanol, and the current was measured. The current density obtained at 0.6 V (vs. NHE), at which voltage methanol oxidation occurs most actively, was divided by the catalyst weight to obtain the methanol oxidation activity.

Figure 5:
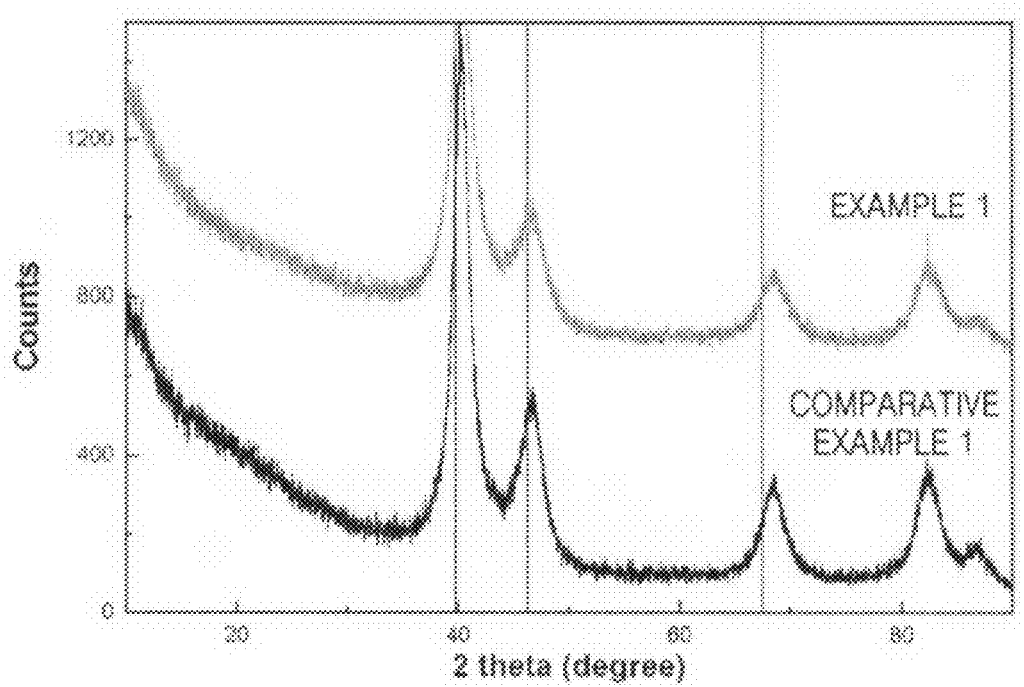
FIG. 5 is a set of X-ray diffraction analysis spectra of the supported catalysts prepared in Example 1 and Comparative Example 1 of the present invention.

Referring to FIG. 5, the supported catalyst containing 70% by weight of PtRu particles prepared in Example 1 exhibited a broadening of the peak for PtRu(220) which appears at near 68.6°. From the results of calculating the crystal size of Pt(220) as shown in Table 1, it can be seen that the size of the PtRu crystals of Example 1 was much smaller than that of the PtRu crystals of Comparative Example 1. The average size of the PtRu particles obtained by TEM was also much smaller in the case of Example 1 than in the case of Comparative Example 1.

Furthermore, the methanol oxidation activity was found to be higher in the PtRu supported catalyst of Example 1 than in the PtRu supported catalyst of Comparative Example 1.

Figure 8:
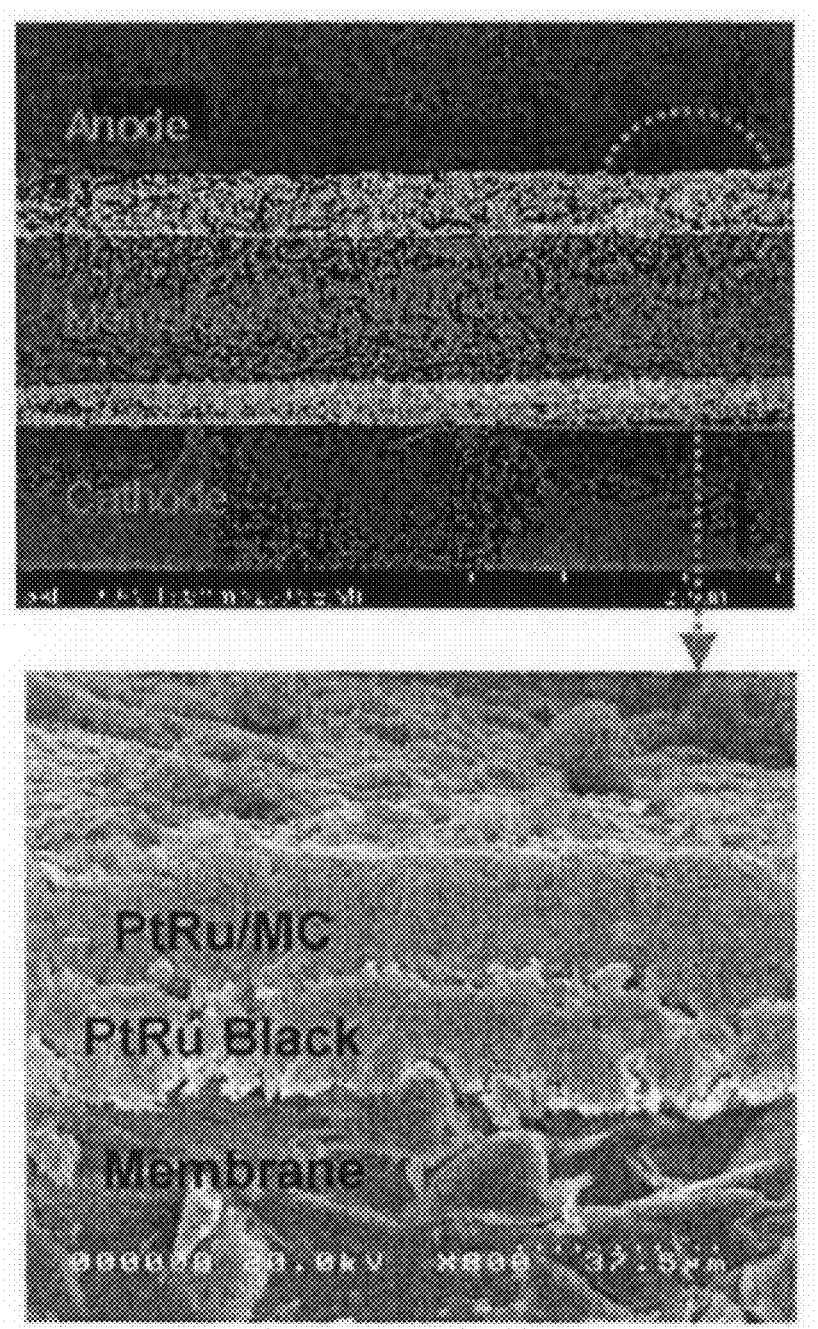
FIG. 8 is a scanning electron micrograph of the anode catalyst layer produced in Example 3 of the present invention.

With respect to the supported catalyst prepared in Example 3, the anode catalyst layer was analyzed by scanning electron microscopy (SEM), and a photographic image thereof is shown in FIG. 8.

Referring to FIG. 8, it can be seen that the anode catalyst layer composed of the anodic first catalyst layer formed from a 70 wt % PtRu/MC and the anodic second catalyst layer formed from a PtRu black non-supported catalyst is disposed on one side of the electrolyte membrane, while a Pt/MC supported catalyst layer is formed onto the other side of the electrolyte membrane as the cathode catalyst layer.

Figure 6:
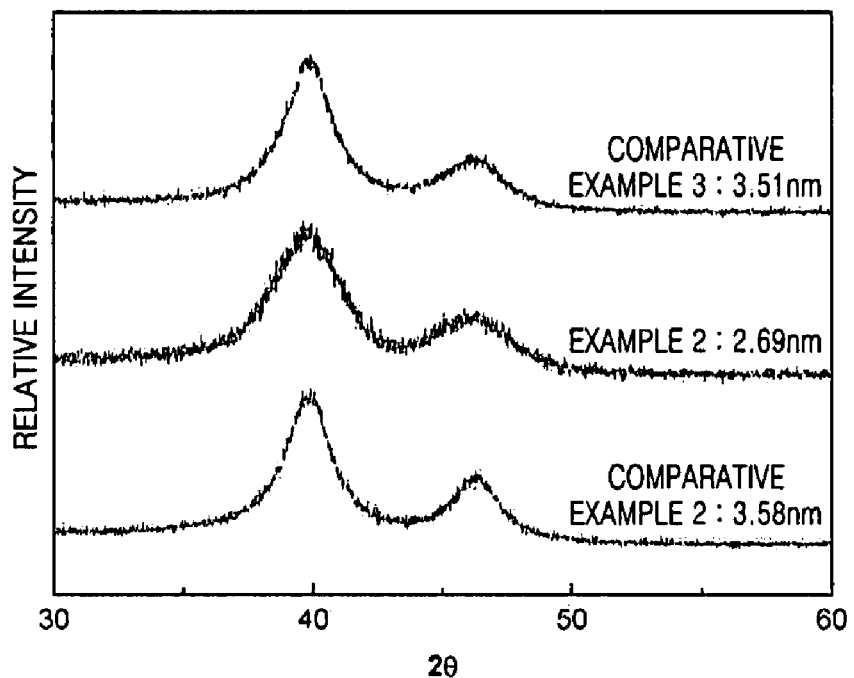
FIG. 6 is a set of X-ray diffraction analysis spectra of the supported catalysts prepared in Example 2, Comparative Example 2 and Comparative Example 3 of the present invention.
Figure 7:
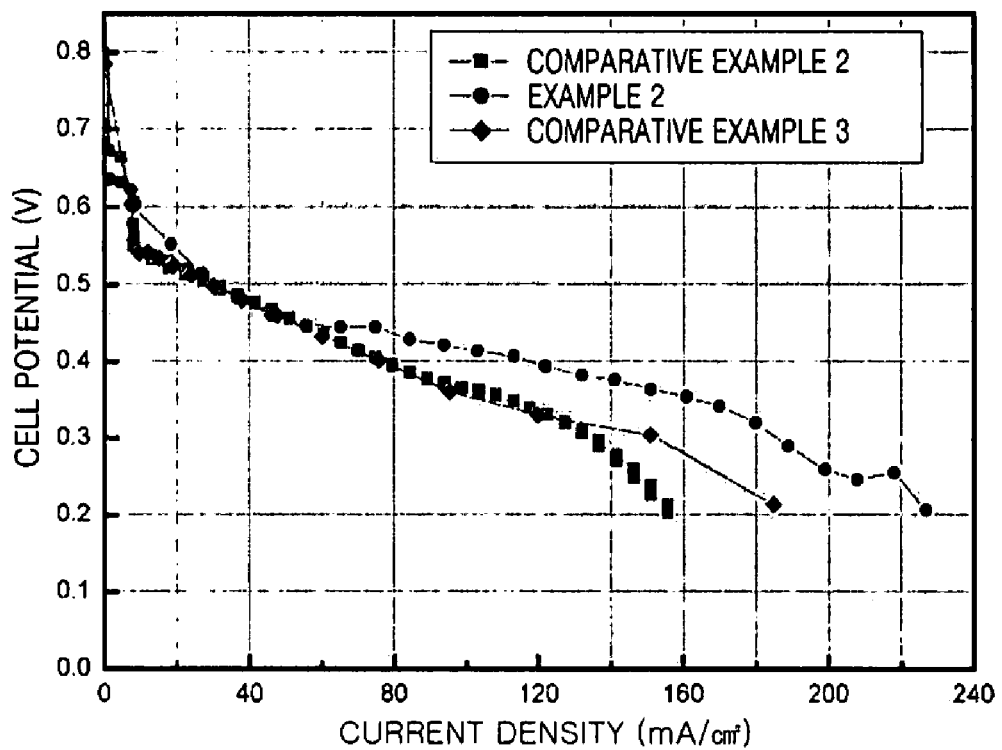
FIG. 7 is a graph of cell potential versus current density for fuel cells employing the supported catalysts prepared in Example 2, Comparative Example 2, and Comparative Example 3 of the present invention.

With respect to the supported catalysts prepared in Example 2, Comparative Example 2 and Comparative Example 3, the size of the Pt crystals, the size of the Pt particles, and the current density were measured, and the results are presented in Table 2 below. X-ray diffraction analysis spectra of these supported catalysts are shown in FIG. 6. Fuel cells were produced while using the supported catalysts prepared in Example 2, Comparative Example 2 and Comparative Example 3 in the cathode catalyst layers, and the unit cell performances of the fuel cells were compared as shown in FIG. 7.

TABLE 1

| | Proportion of PtRu in PtRu/MC supported catalyst (wt %) | Crystal size (nm)[a] | Particle size (nm)[b] | Methanol oxidation activity[c] (A/g at 0.6 V) | Remarks |
|---|---|---|---|---|---|
| Example 1 | 70(*35-35) | 2.99 | 2.63 ± 0.41 | 16.19 | Gas phase reduction and liquid phase reduction applied |
| Comp. Ex. 1 | 70 | 4.08 | 3.65 ± 0.89 | 12.71 | Liquid phase reduction applied |

*The amount of PtRu loaded by a primary gas phase reduction reaction was 35% by weight, while the amount of PtRu loaded by a secondary liquid phase reduction reaction was 35% by weight.
[a]determined by X-ray diffraction (XRD),
[b]determined by transmission electron microscopy (TEM)
[c]The MeOH oxidation activity was electrochemically measured in an aqueous solution of methanol and sulfuric acid, and the specific procedure was as follows.

TABLE 2

|  | Proportion of Pt in Pt supported catalyst | Crystal size (nm)[a] | Particle size (nm)[b] | Current density[c] (m/Acm$^2$@0.4 V, 50° C.) | Remarks |
|---|---|---|---|---|---|
| Example 2 | 60(*30-30) | 2.69 | 2.85 | 120.4 | Gas phase reduction and liquid phase reduction applied |
| Comp. Ex. 2 | 60 | 3.58 | 3.71 | 79.7 | Gas phase reduction applied |
| Comp. Ex. 3 | 60 | 3.51 | 3.22 | 75.7 | Liquid phase reduction applied |

*The amount of Pt loaded by a primary gas phase reduction reaction was 30% by weight, while the amount of Pt loaded by a secondary liquid phase reduction reaction was 30% by weight.
[a] determined by X-ray diffraction (XRD),
[b] determined by transmission electron microscopy (TEM)
[c] Fuel cells were produced as described below, in order to evaluate the current density.

The supported catalysts prepared in Example 2, Comparative Example 2 and Comparative Example 3 were used for the cathode catalyst layers, and PtRu black was used for the anode catalyst layers. Membrane electrode assemblies having the same structure were produced using these catalyst layers, and the current densities were compared.

Referring to the XRD spectra of FIG. 6, the peak for Pt(111) was found to be broader in the supported catalyst of Example 2, compared with the supported catalysts of Comparative Examples 2 and 3. This implies that the crystal size was smaller in the supported catalyst of Example 2. From the results shown in Table 2, it can be seen that the crystal size was near 3.5 nm in both of the cases of Comparative Example 2 and Comparative Example 3, while the crystal size in the case of Example 2 was smaller to be 2.69 nm. The same tendency was shown in the TEM results. The particle size of the supported catalyst of Example 2 measured by TEM was 2.85 nm, which was smaller than that of the supported catalysts of Comparative Examples 2 and 3.

From the results of FIG. 6 and Table 2, it can be seen that the fuel cell employing the supported catalyst of Example 2 had improved current density characteristics, compared with the fuel cells employing the supported catalysts of Comparative Example 2 and Comparative Example 3.

The current density and power characteristics of the MEAs produced in Example 3, Example 4 and Comparative Example 4 were measured, and the results are presented in Table 3. The current density and the power were measured by supplying a 1 M aqueous solution of methanol to the anode and air in an amount of three times the stoichiometrically required amount to the cathode at a unit cell temperature of 50° C. The current density and the power values obtained at an actual operating voltage of 0.4 V are compared in Table 3.

TABLE 3

|  | Cathode | Anode | Current density (mA/cm$^2$)/Power (mW/cm$^2$) at 0.4 V |
|---|---|---|---|
| Comp. Ex. 4 | Pt Black | PtRu Black* | 76/30 |
| Example 3 | Pt/MC | 70(35-35) PtRu/MC PtRu Black | 140/56 |
| Example 4 | Pt/MC | PtRu Black | 120/48 |

*PtRu black indicates a non-supported catalyst comprising PtRu metal only without a carbon support.

Table 3 shows that the fuel cell produced with the MEA of Example 3, which has an asymmetric MEA structure having an anode catalyst layer of bilayer structure containing a supported catalyst and a non-supported catalyst, and a cathode catalyst layer containing a supported catalyst only, had improved current density and power characteristics compared with the fuel cell produced with the MEA of Comparative Example 4.

It was also found that the fuel cell produced with the MEA of Example 3 had higher current density and power than the fuel cell produced with the MEA of Example 4, which had a symmetric MEA structure comprising a single layer anode catalyst layer and a cathode catalyst layer.

According to this embodiment of the method of the present invention, a supported catalyst having a desired loading amount for catalytic metal particles can be obtained by preparing a primary supported catalyst containing catalytic metal particles that are obtained by a primary gas phase reduction reaction of a portion of the final loading amount of catalytic metal, and reducing the remaining portion of the catalytic metal by a secondary liquid phase reduction reaction. Such a supported catalyst has catalytic metal particles with a very small average particle size being uniformly dispersed on a carbon support at a high concentration. A fuel cell produced using the supported catalyst thus has maximal catalyst activity and improved efficiency.

Although a few embodiments of the present invention have been shown and described, it would be appreciated by those skilled in the art that changes may be made in this embodiment without departing from the principles and spirit of the invention, the scope of which is defined in the claims and their equivalents.

What is claimed is:
1. A method of preparing a supported catalyst, the method comprising:
 mixing a first catalytic metal precursor and a first solvent to obtain a first catalytic metal precursor mixture;
 mixing a carbon catalyst support and the first catalyst metal precursor mixture and drying the resulting mixture to obtain a primary supported catalyst precursor;
 subjecting the primary supported catalyst precursor to a hydrogen reduction heat treatment to obtain a primary supported catalyst;
 mixing the primary supported catalyst and a polyhydric alcohol to obtain a primary supported catalyst mixture;
 mixing a second catalytic metal precursor and a second solvent to obtain a second catalytic metal precursor mixture;
 mixing the primary supported catalyst mixture obtained, and the second catalytic metal precursor mixture to obtain a secondary supported catalyst precursor mixture; and adjusting the pH of the secondary supported catalyst precursor mixture, and heating the secondary supported catalyst precursor mixture to obtain a supported catalyst.

2. The method of claim 1, wherein the first catalytic metal precursor is contained in the first catalytic metal precursor mixture in an amount of 20 to 40% by weight of the first catalytic metal precursor mixture.

3. The method of claim 1, wherein the temperature during the hydrogen reduction heat treatment is 100 to 300° C.

4. The method of claim 1, wherein the ratio of the polyhydric alcohol to the primary supported catalyst ranges from is 30:1 to 520:1 by weight of the primary supported catalyst.

5. The method of claim 1, wherein the amount of the catalytic metal particles loaded on the supported catalyst finally obtained is 40 to 90% by weight of the supported catalyst;
the amount of the catalytic metal particles in the primary supported catalyst is 20 to 45% by weight based on the total amount of the catalytic metal particles loaded on the supported catalyst finally obtained; and
the amount of the catalytic metal particles contained in the supported catalyst is 20 to 70% by weight of the total amount of the catalytic metal particles loaded on the supported catalyst finally obtained.

6. The method of claim 1, wherein the second catalytic metal precursor is contained in the second catalytic metal precursor mixture in an amount of 0.2 to 0.8% by weight of the second catalytic metal precursor mixture.

7. The method of claim 1, wherein the pH of the secondary supported catalyst precursor mixture is adjusted to 7 to 14, the heating temperature is 90 to 115° C., and the heating rate is 1 to 20° C. per minute.

8. The method of claim 7, wherein the heating temperature is in the range of 105 to 110° C. and the heating rate is in the range of 1.5 to 5° C. per minute.

9. The supported catalyst prepared according to the method of claim 1.

10. The supported catalyst of claim 9, wherein the supported catalyst contains catalytic metal particles having an average particle size of 1 to 5 nm, and the amount of the catalytic metal particles loaded on the supported catalyst is 40 to 90% by weight of the supported catalyst.

11. An electrode comprising the supported catalyst of claim 9.

12. The electrode of claim 11, wherein the supported catalyst contains catalytic metal particles having an average particle size of 1 to 5 nm, and the amount of the catalytic metal particles loaded on the supported catalyst is 40 to 90% by weight of the supported catalyst.

13. A fuel cell comprising the electrode comprising the supported catalyst of claim 9.

14. The fuel cell of claim 13, wherein the supported catalyst contains catalytic metal particles having an average particle size of 1 to 5 nm, and the amount of the catalytic metal particles loaded on the supported catalyst is 40 to 90% by weight of the supported catalyst.

15. The method of claim 1, wherein the first catalytic metal precursor is a salt containing at least one metal selected from the group of platinum, ruthenium, palladium, rhodium, iridium, osmium and gold.

16. The method of claim 15, wherein the first catalytic metal precursor salt is a platinum salt taken from the group consisting of tetrachloroplatinic acid, hexachloroplatinic acid, potassium tetrachloroplatinate, potassium hexachloroplatinate, and mixtures thereof.

17. The method of claim 15, wherein the first catalytic metal precursor salt is a ruthenium salt taken from the group consisting of ammonium hexachlororuthenate, ammonium aquopentachlororuthenate and ruthenium trichloride.

18. The method of claim 15, wherein the first catalytic metal precursor salt of is taken from the group consisting of hexachloroplatinic acid and ruthenium trichloride.

19. The method of claim 1, wherein the first solvent is taken from the group consisting of acetone, methanol and ethanol, and said first solvent is 60 to 80 weight percent of the first catalytic metal precursor mixture.

20. The method of claim 1, wherein the carbon for the carbon catalyst support of is taken from the group consisting of Ketjen black, acetylene black, activated carbon, carbon molecular sieves, carbon nanotoubes, microporous activated carbon, ordered mesoporous carbon, and mixtures thereof.

21. The method of claim 1, wherein the carbon for the carbon catalyst support has a specific surface area greater than 250 $m^2/g$.

22. The method of claim 21, wherein the carbon for the carbon catalyst support of has a specific surface area ranging from 500 to 1200 $m^2/g$.

23. The method of claim 1, wherein the carbon for the carbon catalyst support of has an average particle diameter ranging from 10 to 1000 nm.

24. The method of claim 23, wherein the carbon for the carbon catalyst support has an average particle diameter ranging from 20 to 500 nm.

25. The method of claim 1, wherein the carbon for the carbon catalyst support has an average pore diameter ranging from 2 to 10 nm.

26. The method of claim 1, wherein the concentration of metal particles in the primary supported catalyst ranges from 25 to 40 weight percent of the primary supported catalyst.

27. The method of claim 26, wherein the concentration of metal particles in the primary supported catalyst of ranges from 30 to 40 weight percent of the primary supported catalyst.

28. The method of claim 1, wherein the temperature of the drying of the mixture of the carbon catalyst support and the first catalyst precursor mixture ranges from ambient temperature to 50° C.

29. The method of claim 28, wherein the temperature of the drying of the mixture of the carbon catalyst support and the first catalyst precursor mixture is ambient temperature.

30. The method of claim 1, wherein the second catalytic metal precursor is a salt containing at least one metal selected from the group of platinum, ruthenium, palladium, rhodium, iridium, osmium and gold.

31. The method of claim 30, wherein the second catalytic metal precursor salt is a platinum salt taken from the group consisting of tetrachloroplatinic acid, hexachloroplatinic acid, potassium tetrachloroplatinate, potassium hexachloroplatinate, and mixtures thereof.

32. The method of claim 30, wherein the second catalytic metal precursor salt is a ruthenium salt taken from the group consisting of ammonium hexachlororuthenate, ammonium aquopentachlororuthenate and ruthenium trichloride.

33. The method of claim 30, wherein the second catalytic metal precursor salt is taken from the group consisting of hexachloroplatinic acid and ruthenium trichloride.

34. The method of claim 1, wherein the second solvent is taken from the group consisting of water and polyhydric alcohols.

35. The method of claim 34, wherein the second solvent of is water.

36. The method of claim 35, wherein the concentration of water in the second catalytic metal precursor mixture is in the range of 30 to 70 weight percent.

37. A method of preparing a supported catalyst, the method comprising:

loading a salt of a catalytic metal on a porous carbon support and subjecting the mixture to a gas phase reduction reaction;

loading an additional amount of the salt of the catalytic metal on the porous carbon support containing reduced catalytic metal and subjecting the second mixture to a liquid phase reduction reaction; and adjusting the pH of the second mixture and heating the second mixture.

38. The method of claim 37, wherein the salt of the catalytic metal contains at least one metal selected from the group consisting of platinum, ruthenium, palladium, rhodium, iridium, osmium and gold.

39. The method of claim 38, wherein the metals are platinum or ruthenium or a mixture thereof.

40. The method of claim 38, wherein the loading of the catalytic metal on the porous carbon support ranges from 40 to 90% by weight of the supported catalyst and the metal particles of the supported catalyst have an average particle size of 1 to 5 nm.

41. The method of claim 37, wherein the porous carbon support has a specific surface area greater than 250 $m^2/g$, an average particle diameter from 10 to 1000 nm, and an average pore diameter of 2 to 10 nm.

42. The method of claim 41, wherein the porous carbon support has a specific surface area ranging from 500 to 1200 $m^2/g$, and an average particle diameter ranging from 20 to 500 nm.

43. The method of claim 37, wherein the gas in the gas phase reduction reaction is hydrogen and the reaction temperature is 100 to 300° C.

44. The method of claim 37, where the liquid phase reduction reaction is carried out within a pH range of 7 to 14, a temperature range of 90 to 115° C. and the heating rate is 1 to 20° C. per minute.

45. The method of claim 44, wherein the temperature range is 105 to 110° C. and the heating rate is 1.5 to 5° C./min.

* * * * *